United States Patent [19]
Rzad et al.

[11] Patent Number: 5,156,882
[45] Date of Patent: Oct. 20, 1992

[54] METHOD OF PREPARING UV ABSORBANT AND ABRASION-RESISTANT TRANSPARENT PLASTIC ARTICLES

[75] Inventors: Stefan J. Rzad, Rexford; Douglas J. Conley; Clive W. Reed, both of Scotia, N.Y.

[73] Assignee: General Electric Company, Schenectady, N.Y.

[21] Appl. No.: 814,172

[22] Filed: Dec. 30, 1991

[51] Int. Cl.⁵ .............................................. B05D 3/06
[52] U.S. Cl. ................................... 427/489; 427/569; 427/412.1; 427/419.3; 427/419.5; 427/419.7
[58] Field of Search ............ 427/38, 44, 412.1, 419.3, 427/419.5, 419.7

[56] References Cited

U.S. PATENT DOCUMENTS

| | | | |
|---|---|---|---|
| 3,713,869 | 1/1973 | Geffcken et al. | 204/165 |
| 4,190,681 | 2/1980 | Hall et al. | 427/45.1 |
| 4,328,646 | 5/1982 | Kaganowicz | 51/281 R |
| 4,842,941 | 6/1989 | Devins et al. | 428/412 |
| 4,927,704 | 5/1990 | Reed et al. | 428/221 |

Primary Examiner—Bernard Pianalto
Attorney, Agent, or Firm—Sudhir G. Deshmukh; William H. Pittman

[57] ABSTRACT

A method of preparing transparent plastic articles having an improved protective stratum thereon. The protective stratum provides protection from UV light and abrasion. The article includes a polycarbonate substrate and multi-layered coating applied by plasma enhanced chemical vapor deposition on surface of the substrate.

11 Claims, 4 Drawing Sheets

METHOD OF PREPARING UV ABSORBANT AND ABRASION-RESISTANT TRANSPARENT PLASTIC ARTICLES

FIELD OF THE INVENTION

This invention relates generally to plastic articles, and more particularly to polycarbonate articles exhibiting improved abrasion resistance and UV absorbance.

BACKGROUND OF THE INVENTION

Engineering resins are well-known, commercially available materials possessing physical and chemical properties which are useful in a wide variety of applications. For example, polycarbonates, because of their excellent breakage resistance, have replaced glass in many products, such as automobile head-lamps and stoplight lenses; safety shields in windows, architectural glazing, and the like. However, major defects exhibited by polycarbonates are their very low scratch-resistance and their susceptibility to ultraviolet light-induced degradation.

Methods for improving the scratch-resistance of plastics such as polycarbonate have involved disposing an inorganic protective layer on the surface of the polycarbonate. For example, in U.S. Pat. No. 4,328,646, issued to Kaganowicz, an abrasion-resistant article is formed by subjecting a mixture of hardcoating precursors to a glow discharge, and depositing the product directly on a plastic substrate as a very thin film. However, inorganic hardcoatings such as silicon dioxide ($SiO_2$) deposited directly onto plastics such as polycarbonate have performance problems when the system is subjected to stresses produced by mechanical or thermal effects. These problems are due to the difference in property characteristics of inorganic and plastic materials. For example, the thermal expansion coefficient for polycarbonate is about $7 \times 10^{-5}$ m/m/°C., while the coefficient for Pyrex ® glass is $3 \times 10^{-6}$ m/m/°C. These differences result in tangential stresses at the interface of the plastic and the hardcoating which may in turn cause cracking of the hardcoating as a stress relief mechanism, especially when the article is subjected to various heating/cooling cycles. In attempting to alleviate this problem, Hall et al. and Geffcken et al. in U.S. Pat. Nos. 4,190,681 and 3,713,869, respectively, proposed the use of an intermediate layer to improve adhesion between the hard inorganic layer and the plastic layer. Furthermore, in Devins et al. U.S. Pat. No. 4,842,941 and assigned to the assignee of the present invention, there is disclosed an intermediate layer which not only improves adhesion but also provides a transition in properties from the plastic to the inorganic hardcoating, thus resulting in improved mechanical and thermal performance. The intermediate layer may further contain UV absorbers. Finally in Reed et al. U.S. Pat. No. 4,927,704 and assigned to the assignee of the present invention, there is disclosed a plastic article having a gradational coating which not only improves mechanical and thermal performance but also provides abrasion resistance. The Reed patent discloses an interfacial layer on the surface of a substrate which gradually changes to an abrasion resistant layer. The interfacial layer may further contain UV absorbers. The present invention is directed to a process that is based on plasma enhanced chemically vapor deposited (PECVD) protective stratum that not only provides a high adherence and UV protection but also improves abrasion resistance while reducing manufacturing costs by using a (PECVD) process for depositing various layers.

There is a continuing interest in improving methods for forming articles having still greater abrasion resistance while also exhibiting improvements in various other physical properties. The present invention provides a method for forming plastic articles having a high level of UV and abrasion resistance, with resistance to cracking under exposure to thermal and mechanical stresses, while reducing manufacturing costs associated with the application of the protective stratum.

STATEMENT OF THE INVENTION

The present invention is directed to a method of forming a transparent, abrasion resistant and ultraviolet light absorbant article comprising, plasma enhanced chemical vapor deposition of an interfacial layer of an adherent resinous composition on the surfaces of the article, plasma enhanced chemical vapor deposition of a layer of an ultraviolet light absorbant composition selected from the group consisting of zinc oxide, titanium dioxide, cerium dioxide and vanadium pentoxide on the interfacial layer of the adherent resinous composition, and plasma enhanced chemical vapor deposition of a layer of an abrasion resistant composition on top of the layer of the ultraviolet light absorbant composition, the layer of the abrasion resistant composition exhibiting increase in haze of less than 15% after 1000 cycles under The Taber Abrasion Test, designated by American Society for Testing and Materials, as ASTM D1044 or its equivalent.

DETAILED DESCRIPTION OF THE PREFERRED EMBODIMENT

Figure 1:
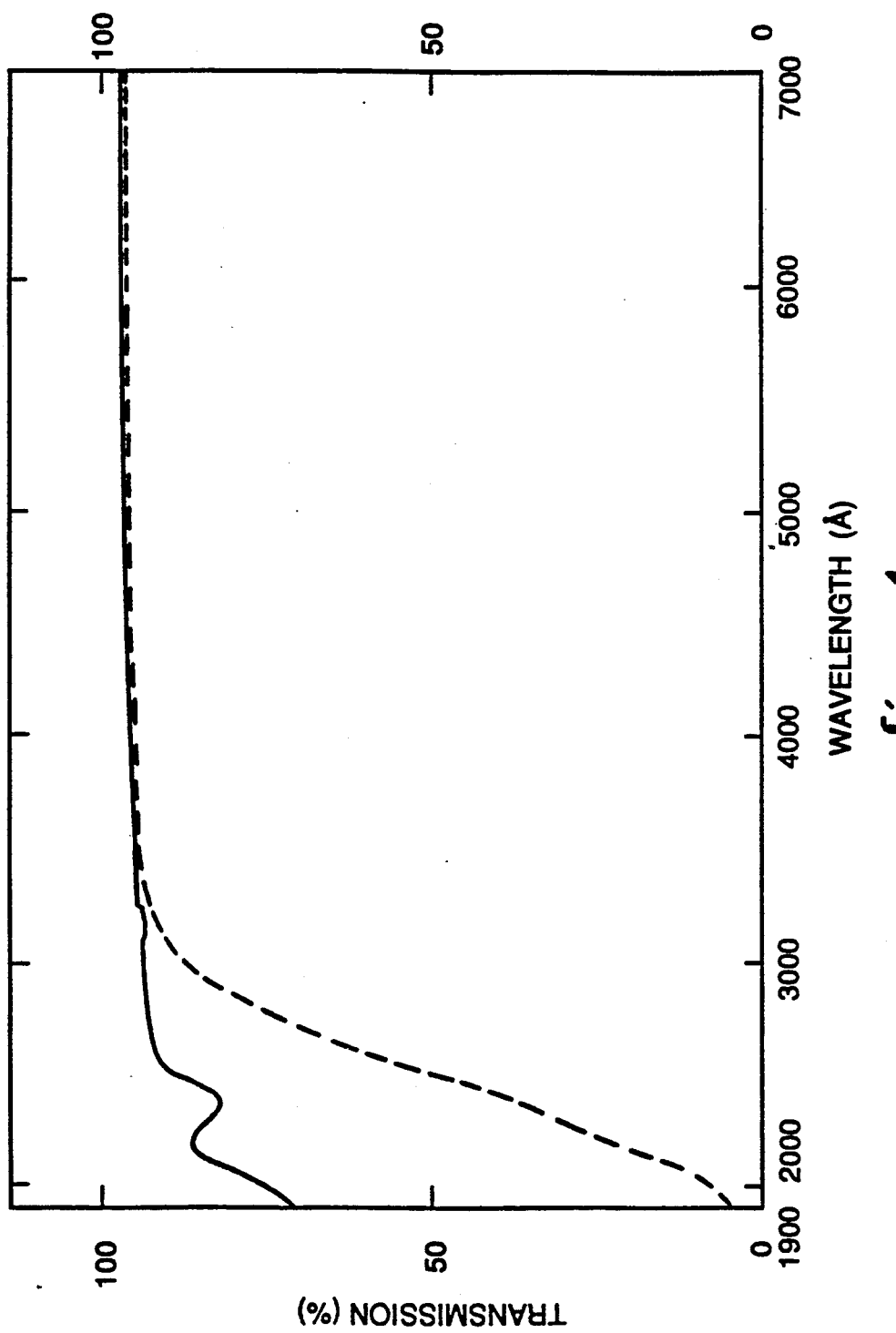
FIG. 1 shows a graph of a percentile transmissivity comparison between a pure quartz substrate and a quartz substrate having a plasma polymerized interfacial layer thereon.

The article formed by the method of the present invention may include any transparent plastic material as a substrate. Illustrative plastics include acrylic, polystyrene, polycarbonate and acrylonitrile-butadiene-styrene. Blends of these materials as well as blends with other materials such as impact modifiers are also possible. Furthermore, the substrates may contain various additives such as fillers, plasticizers, tints color additives and the like.

The preferred substrate is formed of polycarbonate or an acrylic resin such as poly(methyl methacrylate). Polycarbonates are especially preferred materials for transparent substrates because of their excellent physical, mechanical and chemical properties. In general, the choice of substrate is ultimately determined by the end use contemplated for the article.

Polycarbonates suitable for forming such a substrate are well-known in the art and are described, for example, in U.S. Pat. Nos. 4,200,681, 4,842,941 and 4,210,699, all incorporated herein by reference. Such polycarbonates generally comprise repeating units of the formula

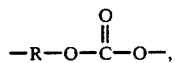

in which R is a divalent radical of a dihydric phenol, e.g., a radical of 2,2-bis(4-hydroxyphenyl)-propane, also known as bisphenol A,

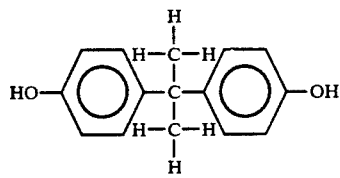

Polycarbonates within the scope of the present invention may be prepared by several well-known methods. For example, preparation may be accomplished by reacting a dihydric phenol with a carbonate precursor. A wide variety of dihydric phenols, such as bisphenol A, may be used in the present invention; many are disclosed in U.S. Pat. Nos. 2,999,835; 3,082,365; 3,160,121; 3,334,154; and 4,190,681, all incorporated herein by reference. Many carbonate precursors may be used; they are typically either a carbonyl halide, a carbonate ester, or a haloformate. Exemplary carbonate precursors are described in U.S. Pat. No. 4,190,681.

The term "polycarbonate" is meant herein to additionally include transparent polymer blends of polycarbonates with various other materials such as polyesters and impact modifiers.

The substrate may be shaped into a variety of forms, depending on the end use contemplated for the articles. For example, a polycarbonate film substrate may be formed by casting the molten polymer onto a flat open mold, and then pressing the material to a uniform thickness. After cooling, the film may then have multiple layers applied thereover, as further described below to provide a protective stratum thereon. Furthermore, the substrate may be in the form of tubes, rods, or irregular shapes. When the article of the present invention is to be used as a glazing material, a polycarbonate material may be formed into flat or curved sheets by well-known methods, e.g., extrusion, injection molding, or thermoforming.

If required, the substrate surface may be cleaned by washing with an alcohol solvent such as isopropanol prior to application of the PECVD layer. This step removes dirt, contaminants, and additives such as wetting agents from the surface.

After being washed, the substrate is vacuum-desiccated by well-known methods to remove any water on or in the surface region which would interfere with the adhesion of the subsequently-deposited layers. Desiccation temperatures range from about ambient temperature to about 120° C., with the preferred range being about 80° C. to about 90° C. Desiccation duration ranges from about 2 hours to about 16 hours, with longer times within this range compensating for lower temperatures, and vice versa.

The surface of the substrate may be etched after placement in the reaction chamber. Etching techniques, which in general are well-known in the art, may also be used to provide improved adhesion between these layers.

A first layer also known as an interfacial layer is applied over the surface of a substrate according to the method of the present invention. "Interfacial layer" as used herein is meant to define a layer of an adherent resinous composition disposed between a subsequently-applied upper layer of the present invention and the surface of the substrate.

The composition of the plasma-applied interfacial material of the present invention depends on the end use contemplated for the article. Organosilicones are particularly useful for forming the interfacial material, especially when the abrasion-resistant material is silicon dioxide. "Organosilicone" as used herein is meant to embrace organic compounds in which at least one silicon atom is bonded to at least one carbon atom, and includes silcone materials, as well as materials commonly referred to as silanes, siloxanes, silazanes, and organosilicones. Many of the organosilicones suitable for the method and article of the present invention are described in *Organosilicon Compounds*, C. Eaborn, Butterworths Scientific Publications, 1960. Other suitable organosilicon compounds are described in *Organic Polymer Chemistry*, K. Saunders, Chapman and Hall Ltd., 1973. Non-limiting examples of organosilicon compositions useful for the present invention are compounds represented by the general formula

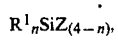

wherein $R^1$ represents a monovalent hydrocarbon radical or a halogenated monovalent hydrocarbon radical, Z represents a hydrolyzable group, and n may vary between 0 and 2. More specifically, Z is preferably a member such as halogen, alkoxy, acyloxy, or aryloxy. Such compounds are well-known in the art and are described, for example, in S. Schroeter et al.'s U.S. Pat. No. 4,224,378, incorporated herein by reference.

Other exemplary organosilicones falling within the scope of the present invention include silanols having the formula

wherein $R^2$ is selected from the group consisting of alkyl radicals containing from about 1 to about 3 carbon atoms, the vinyl radical, the 3,3,3-trifluoropropyl radical, the gamma-glycidoxypropyl radical and the gamma-methacryloxypropyl radical, with at least about 70% by weight of the silanol being $CH_3Si(OH)_3$. Such compounds are described in U.S. Pat. No. 4,242,381, incorporated herein by reference.

Preferred organosilicon compounds of the present invention are hexamethyldisilazane, hexamethyldisiloxane, vinyltrimethylsilane and octamethylcyclotetrasiloxane, hexamethyldisiloxane being most preferred.

The interfacial material may alternatively comprise plasma-polymerized acrylic materials. For example, an acrylic acid ester monomer or methacrylic acid ester monomer may be vaporized and then plasma-polymerized to form a polymeric coating which is deposited on the underlying coating surface. Many of these materials are generally described in U.S. Pat. No. 4,842,941; in the *Encyclopedia of Polymer Science and Technology*, Volume I, Interscience Publishers, John Wiley and Sons, Inc., 1964, and in *Chemistry of Organic Film Formers*, by D. Solomon, John Wiley and Sons, Inc., 1967, as well as references cited in each of the texts. Other exemplary acrylic materials are described in U.S. Pat. Nos. 4,239,798 and in 4,242,383, both incorporated herein by reference.

The interfacial material may alternatively be an olefin polymer. Nonlimiting examples of suitable polyolefins include polyethylene, polypropylene, polyisoprene, and copolymers of these types of materials. Further included within the broad definition of polyolefin as used herein are synthetic and natural elastomers, many of which are described in the *Encyclopedia of Polymer Science and Technology*, Vol. 5, pp. 406–482 (1966), the disclosure of which is incorporated by reference herein. Many of these materials can be deposited according to the present invention by vaporizing and then plasma-polymerizing their monomer precursors under the plasma conditions described below.

The interfacial layer of the present invention preferably has a thickness of about 100 to about 10,000 angstroms (Å), preferably about 3000 Å.

The protective stratum of the present invention further comprises an UV absorbant layer applied on top the interfacial layer according to the method of the present invention. Nonlimiting examples of compounds suitable for the UV absorbant material include zinc oxide, titanium dioxide, cerium dioxide, and vanadium pentoxide. Mixtures of such materials are also possible. Titanium dioxide is preferred. The UV absorbant layer of the present invention preferably has a thickness of about 1000 to about 10,000 Å, preferably about 5000 Å.

The protective stratum of the present invention further comprises the abrasion resistant layer applied on top of the UV absorbant layer according to the method of the present invention. Nonlimiting examples of compounds suitable for the abrasion resistant material include silicon dioxide, silicon nitride, silicon oxynitride, silicon carbide, silicon carbonitride, boron oxide, boron nitride, aluminum oxide, aluminum nitride, tantalum oxide, iron oxide, germanium oxide, and germanium carbide. Mixtures of such materials are also possible. When the article is to be used as a glazing material, a silicon dioxide top layer is preferred because of its ease of plasma deposition, its excellent transparency, and the relatively inexpensive cost of its precursors. It should be understood that "precursor" as used herein is meant to include either one precursor or more than one precursor, depending on the particular materials being used. The abrasion resistant layer of the present invention is provided with a thickness of about 20,000 to about 90,000 Å, preferably about 50,000 Å. The aforementioned abrasion resistant layer exhibits an increase in haze of less than about 15% after 1000 cycles under The Taber Abrasion Test, described below. The Taber Abrasion Test is designated by American Society for Testing and Materials, as ASTM D1044. It is understood that any other test equivalent to ASTM D1044 is also suitable for determining the abrasion resistance of the abrasion resistant layer of the present invention.

The deposition of the various layers of the protective stratum is accomplished by PECVD, which in general is a method of applying films from a gaseous electrical discharge to a substrate. For example, the *Kirk-Othmer Encyclopedia of Chemical Technology*, Volume 10, discusses the plasma deposition of inorganic materials. Furthermore, details regarding the plasma deposition of inorganic thin films are given in *Thin Film Processes*, Ed. by Vossen and Kern, Academic Press, 1978. Exemplary plasma deposition methods are also described in U.S. Pat. Nos. 4,096,315, 4,137,365, 4,361,595, and 4,396,641.

The following general statement regarding the operation of PECVD for the present invention applies to the deposition of the interfacial material, the UV absorbant material and the abrasion-resistant material. When an electrical discharge is produced at low pressure in the film-forming reactants, the reactants become ionized, forming a plasma. A portion of the material is in the form of reactive species, such as ions, electrons, and atomic free radicals generated in the plasma prior to formation of the film over or upon the substrate. A distinct advantage of PECVD over conventional chemical vapor deposition processes lies in the fact that the applied electric field enhances reactive species formation, thereby permitting the use of deposition temperatures which are low enough to prevent damage to substrates such as polycarbonates, i.e., temperatures less than about 130° C. Furthermore, when used under the process conditions disclosed herein, PECVD can be carried out with a much higher percentage of reactive species than is possible with conventional CVD.

A PECVD system, such as a bell jar vacuum system utilizing capacitively coupled parallel plate electrodes is suitable for the process disclosed herein. However, in order to achieve the excellent results obtained by the present invention, use of this or any other PECVD apparatus must fall within the processing and compositional parameters disclosed herein.

In applying the various layers that form the protective stratum by PECVD the substrate is placed in a reactor chamber in which an electric field can be generated. The reactor chamber must be capable of being substantially evacuated, i.e., to a pressure of less than or equal to about 1.0 milliTorr.

The method of generating and applying the electric field is not critical to this process. For example, the field may be generated by inductive coupling systems, as described, for example, by J. Vossen in *Glow Discharge Phenomena in Plasma Etching and Plasma Deposition*, J. Electrochemical Society, February 1979, pp. 319–324.

A capacitively coupled system may also be used to generate an electric field, and is preferred for use in the present invention. By this technique, which is generally described in the Vossen article referred to above, two electrodes are situated within the reaction chamber, and the plasma is formed therebetween. Each electrode may be a plate of a material that is a good electrical conductor, e.g., aluminum. The electrodes preferably each have a planar face parallel to the other electrode.

In preferred embodiments of the present process wherein the capacitively coupled system is utilized, the electrodes are horizontally arranged, i.e., an upper electrode is affixed in the upper region of the reactor chamber with a planar surface facing a planar surface of a lower electrode affixed in the lower region of the vacuum chamber. The spacing between the electrodes depends on the desired strength of the applied electric field, as well as the size of the article being coated. Those skilled in the vapor deposition art appreciate the interrelationship of these processing variables and are therefore able to make adjustments for a particular use of this invention without undue experimentation. In preferred embodiments, the substrate is positioned on the surface of the lower electrode which faces the upper electrode, such that the substrate surface to be coated is parallel to the facing surface of the upper electrode. Alternatively, the electrodes might be arranged vertically or along other geometric planes within the chamber as long as a plasma can be generated therebetween.

Film-forming materials must be in vapor or gaseous form for the PECVD process. Vapor reactants, such as acrylic, olefinic, or organosilicon monomers, are vaporized from the liquid form prior to entry into the reactor chamber. A preferred technique when sufficient vapor pressures are difficult to obtain is to introduce a mist of the liquid into the plasma region.

In preferred embodiments, the liquid material may be degassed by cooling it and then subjecting it to a vacuum. Depending on its particular boiling point, the liquid is then heated to ambient temperature or higher in order to provide sufficient positive vapor pressure to flow through a channeling system such as that described below. Alternatively, a carrier gas such as helium can be blown through the liquid to obtain a diluted vapor mixture of desired composition.

Gaseous reactants such as silane or nitrous oxide are suitable in natural form for reaction in the plasma, alone or with a carrier gas to insure proper metering into the reactor chamber. Sometimes, e.g., in the case of nitrous oxide, the reactants may be stored in liquid form beforehand.

The reactor chamber is evacuated prior to entry of the gaseous reactants. Chamber pressures as required for the process of the present invention range from about 10 milliTorr to about 10 Torr.

The gaseous reactants which form the composition of the protective stratum may be supplied from an external source through a series of inlet pipes into the reactor chamber. The technical particularities of channeling the various gases into the reactor chamber are well-known in the art and need not be described in detail here. For example, each gas inlet may be connected to a central feed line which carries the gases into the reactor chamber. In preferred embodiments, gaseous or vaporized reactants for the interfacial, UV absorbant, and the abrasion-resistant composition are mixed with a carrier gas such as helium to improve the flow of the reactants. The flow of carrier and reactant gases into the reactor may be governed by mass flow controller valves which are well-known in the art and which serve to both measure the flow of gases and to control such flow. Furthermore, the carrier gas, when used, may be premixed with the gaseous or vaporized reactants or may be fed into the central feed line by a separate inlet. For example, when silane (SiH$_4$) is used as a reactant for forming silicon dioxide, it may be premixed with helium in a SiH$_4$/He volume ratio ranging from about 2:98 to 20:80. Although a carrier gas is not critical to the present invention, its use improves the uniformity of plasma density and gas pressure within the reactor chamber. Furthermore, use of the carrier gas tends to prevent gas phase particulation of the plasma-formed coating material, and also improves film quality in terms of transparency and abrasion resistance.

Formation of the protective stratum is facilitated by the use of separate inlet pipes for reactants forming the interfacial material, UV absorbant material and for reactants forming the abrasion-resistant material. The flow of each of these gases is also controlled by the mass flow controller valves described above. Since the interfacial material is often formed from reactants which are liquids at room temperature, the material is advantageously stored in a supply vessel located in an oven to allow for the vaporization of the material prior to entry into the reactor chamber.

When using the capacitively coupled system, the gaseous or vaporized reactants entering the reactor chamber from the central feed line are passed between the upper and lower electrodes and over the substrate to be coated. The quality of the protective coating on or over the substrate depends greatly on both the flow rate of the reactants and the flow dynamics, i.e., laminar characteristics, as described below. For example, excessive flow rates would force the active, film-forming reactants past the zone above the deposition surface before they react to form the coating on the surface. Conversely, if the flow rate is too small, the film-forming reactants will quickly be depleted and thereby lead to nonuniformities in film thickness.

The flow rate of interfacial material reactants may range from about 5 standard cubic centimeters per minute (sccm) to about 50 sccm, with about 10 sccm to about 30 sccm being preferred, and about 14 sccm being most preferred. For coating surfaces larger than about 10 square feet, which might require reactor chambers larger than the PECVD described earlier, higher flow rates may be desirable, e.g., up to about 2000 sccm. As further described below, the interfacial material reactants may be passed into the reactor chamber with a carrier gas, such as helium at a flow rate of about 100 to about 400 sccm, preferably at about 200 sccm.

The flow rate of UV absorbant precursor material, such as titanium isopropoxide may range from about 1 sccm to about 10 sccm, with about 1.5 sccm to about 3.5 sccm being preferred, and about 2.3 sccm being most preferred. The UV absorbant precursor material is oxidized with an oxidizing agent, such as oxygen at a flow rate of about 10 to 50 sccm, preferably about 25 sccm. For coating surfaces larger than about 10 square feet, which might require reactor chambers larger than the PECVD reactor described earlier, higher flow rates may be desirable, e.g., up to about 2000 sccm. As further described below, the UV absorbant precursor material reactants may be passed into the reactor chamber with a carrier gas, such as helium at a flow rate of about 100 to about 400 sccm, preferably at about 170 sccm. The following reaction is believed to occur during the deposition of titanium dioxide, $$Ti[OCH(CH_3)_2]_4 + O_2 \xrightarrow{He} TiO_2 + \text{byproducts}$$

The individual flow rates of reactants forming the abrasion-resistant material range from about 0.4 sccm to about 1000 sccm for each reactant when a carrier gas is used, and from about 20 sccm to about 1000 sccm without a carrier gas. For example, a silicon dioxide coating may advantageously be formed by flowing silane at a rate of about 0.4 sccm to about 20 sccm, preferably at about 12 sccm and nitrous oxide at a rate of about 100 sccm to about 1000 sccm, preferably at about 380 sccm into the reactor along with a carrier gas flowing at a constant value in the range between about 20 sccm and 1000 sccm, preferably at about 600 sccm. As in the case of the interfacial material precursor flow rates, higher abrasion resistant material precursor flow rates may be desirable for coating surfaces larger than about 10 square feet. For example, in forming silicon dioxide, silane flow rates up to about 250 sccm, nitrous oxide flow rates up to about 8000 sccm, and an increase in carrier gas flow proportional to the increase in silane flow might be used. Those of ordinary skill in the art will be able to easily select a proper flow rate for a particular substrate and coating material if the teachings herein are followed. The following reaction is believed to occur during the deposition of silicon dioxide,

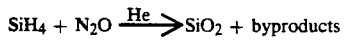

While gas flow, gas pressure, and plasma power may be varied within the ranges described above in order to suit the requirements of a particular end use, it may be desirable in some embodiments to maintain these three parameters as fixed values during formation of the protective stratum in order to maintain a steady plasma.

Laminar flow of the gaseous reactants relative to the deposition surface is of great importance to the present invention because it enhances the uniformity of the coating in terms of thickness and properties such as hardness, clarity, and, for the interfacial material, adhesive and thermal expansion compensation capabilities.

"Laminar flow" as used herein is defined as smooth and steady flow, i.e., a substantially streamlined flow of gaseous reactants relative to the substrate and characterized by the absence of turbulent flow of reactant molecules. This type of gas flow is described, for example, in *Fluid Mechanics*, by F. White, McGraw-Hill Book Company, 1979, p. 305 et seq., the disclosure of which is incorporated herein by reference. As described in the White text, laminar flow may be generally characterized by a Reynolds value of between about 1 and 1000. In preferred embodiments of this invention, a particularly preferred Reynolds value is about 2.5. Those skilled in the art understand that small areas of turbulence may be present, but do not significantly affect the properties of the deposited coating. Furthermore, as pointed out above, the mass flow of each gas may be regulated by adjustment means to control the laminar flow characteristics of the gaseous reactants.

In preferred embodiments, the coating surface is heated to a temperature between about 100° C. and 130° C. during plasma deposition, 100° C. being the most preferred temperature. The heating can be accomplished by a variety of well-known methods. For example, the resistively-heated lower electrode upon which the substrate rests serves to provide heat to the coating surface through the substrate. In some embodiments of this invention, coating surface temperatures of 100° C. or higher increase the deposition rate of the abrasion-resistant material onto the underlying surface. Furthermore, the elevated temperature may also result in greater abrasion resistance. It should also be understood that deposition onto a coating surface maintained at between about room temperature and 100° C. is also within the scope of this process.

As the reactants enter the reaction chamber after the coating surface is treated as described above, an electric field is generated under preselected frequency and power conditions to ionize the gas mix, thereby forming a plasma. Methods of generating an electric field between electrodes are well-known in the art and therefore do not require an exhaustive description here. A dc field, or an ac field from 50 Hz to about 10 GHz, may be used. Power values range from between about 10 watts to 5000 watts. A particularly suitable electrical field-generating means for this process is the use of a high frequency power supply to initiate and sustain the plasma. When such a power supply is used, a preferred operating frequency is 13.56 MHz, as described, for example, in R. Kubacki's U.S. Pat. No. 4,096,315, incorporated herein by reference, except for the UV absorbant layer. The preferred operating frequency during the formation of the UV absorbant layer is 75 KHz. The particular frequency and power values utilized will depend in part on the particular deposition requirement for the coating material. For example, when organosilicon monomers are reacting in the plasma, lower frequencies and higher electrical power values within the above-described ranges increase the polymerization rate and deposition rate of the material, especially when lower chamber pressures within the above-mentioned range are also employed.

An additional refinement, well-known in the art, which offers the potential for beneficially modifying the plasma (e.g., by increasing the ionization and providing improved spatial control of the plasma), uses separate magnetic fields in conjunction with the electric field. An example of such magnetic enhancement is "ECR" (electron cyclotron resonance) microwave plasma technique.

As mentioned above, the protective stratum may be formed by feeding plasma-polymerizable interfacial material precursors into the reactor, then changing the feed composition to UV absorbant material precursors and finally changing to abrasion-resistant material precursors. The change in feed composition may be accomplished by manually adjusting the flow of each gas into the central feed line. Those skilled in the art appreciate that such gas flow adjustment can also be accomplished automatically by various means. Each adjustment is made according to a prescribed time and flow rate regimen based on data obtained from the mass flow controller valves.

In preferred embodiments, the PECVD deposition of the protective stratum occurs in three stages: a first stage in which the interfacial material precursor is fed into the reactor and plasma-polymerized; a second stage in which the UV absorbant material precursor is fed into the reactor and deposited; and a third stage in which the abrasion-resistant material precursors are fed into the reactor and deposited. A carrier gas is often used during each stage of the deposition. The length of each stage is determined by the desired thickness of each sublayer. The resulting protective stratum has a sublayer of interfacial material closest to the substrate, a sublayer of UV absorbant material on top of the sublayer of interfacial material and a sublayer of abrasion-resistant material farthest from the substrate.

The overriding consideration for feed composition adjustment is, of course, the desired characteristics of the deposited protective stratum. For example, an article requiring an especially high level of UV absorbance but not likely to be subjected to high levels of abrasion may be formed by increasing the time period of UV absorbant material precursor flow and decreasing the time period of abrasion resistant material precursor flow. The resulting article would thus have a thicker UV absorbant layer than an article formed according to the regimen exemplified above.

Additionally, an article likely to be subjected to wide temperature variations may be formed by increasing the time period of interfacial material precursor flow to produce an article having more of its depth as an interfacial material.

The thickness of the protective stratum is in part determined by the contemplated end use of the article, and generally may range from about 20,000 Å to about 90,000 Å. Similarly, the thickness of each zone or sublayer depends on the end use of the article.

After passing over the coating surface, the carrier gas and any gas reactants or products which have not been deposited on the substrate surface may be directed out of the chamber through an exit valve and then to a gas pumping and exhaust system. Means for expelling these excess materials from the chamber are well-known in the art. Furthermore, after the application of the protective stratum, residual gases may be removed from the reactor chamber by pumping means.

Embodiments of the present invention result in the formation of articles having UV resistance, a high degree of hardness and abrasion resistance. Furthermore, the process provides a transparent glazing material that results in articles that are very smooth and substantially free from microcracks.

EXAMPLES

The present invention will be further understood from the illustration of specific examples which follow. These examples are intended for illustrative purposes only and should not be construed as limitation upon the broadest aspects of the invention.

A brief description of the tests utilized in some or all of the following examples will now be given:

Abrasion resistance was measured by a combination of two ASTM test methods. The first part comprised The Taber Abrasion Test, ASTM D1044, used with a 1,000 gram total weight load evenly distributed on the two wear wheels. One thousand cycles were used during the test. The second part comprised ASTM D1003, which uses a Gardner Hazemeter, Model XL-835 coupled to a XL-800 controller. In this method, the percentage of light scattering ($\Delta$Haze) was measured before and after the specimen was taber-abraded under The Taber Abrasion Test. A lower $\Delta$Haze value indicated better abrasion resistance and hardness.

Optical transparency [T(%)] was measured on a UV-Visible Shimadzu Graphicord Spectrometer, Model 246, and on a Hitachi U-340 Spectrometer.

Adhesion was measured by a modified ASTM D3359 Test. Unlike the standard ASTM D3359 Test in which a 1.0 inch (2.54 cm) square of the material is cross-hatched into 2.0 mm squares, no such cross-hatching was undertaken. A 3M Company No. 610 adhesive tape was pressed onto the surface of the coating and removed with a swift, even pull. The amount of material remaining on the sample was indicative of the adherence characteristics of the coating to an underlying surface. If no material adhered to the 3M tape during the pulling action, the adherence of the layer on the surface was considered to have met the requirements of the aforementioned modified adhesion test.

The thickness of the coating applied to the substrate by plasma deposition was controlled and determined by process conditions and processing time, as described above. Once the reactant gas mix flow rate, substrate temperature, frequency, and pressure have been set, thickness can be determined within about ±10% by simply timing the duration of the process. For coating thicknesses from about 0.1 micron to about 10 microns, a profilometer (Sloan Dektak II) provided a determination of coating uniformity. Small, thin silicon wafers were positioned at strategic locations prior to deposition of the coating and then removed afterwards, exposing the steps used for measuring thickness. Below 0.1 microns, the thicknesses and the refractive indices were determined ellipsometrically with a Rudolph Model 2345 A5C Ellipsometer.

The water soak test comprised placing a plastic substrate having an appropriate coating or coatings thereon in a bath of distilled water maintained at 50° C. The samples were examined periodically for delamination and tested for adhesion. After seven days, the test was terminated.

Plasma depositions were carried out sequentially in a capacitively coupled reactor operating at RF frequencies. The electrode area was 23 centimeters × 23 centimeters and the gap 4 centimeters. The substrate temperature was maintained at 100° C. The depositions of the coatings were made on bisphenol A-based polycarbonate samples of 10 centimeters × 10 centimeters in size and 0.32 centimeters in thickness. Concomitant depositions were also carried out on quartz disks (2.54 centimeters in diameter and 0.32 centimeters in thickness) to assess the spectral characteristics of the coatings without interference from the polycarbonate absorption, since a stabilized polycarbonate absorbs light below 3900 Å. It should be noted that polycarbonates are generally stabilized with additives, which affect UV absorption characteristics of such stabilized polycarbonates.

EXAMPLE 1

An interfacial layer of 3000 Å thickness comprising hexamethyldisiloxane (HMDSO) was plasma polymerized on the surface of the polycarbonate sample using the following process parameters:

| Flow rates | He | 200 sccm |
|---|---|---|
| | HMDSO | 14 sccm |
| Pressure | | 0.6 Torr |
| Power | | 120 Watts |
| Frequency | | 13.56 MHz |
| Deposition Rate | | 50 Å/min |

The resulting transparent layer having index of refraction of 1.49, adhered extremely well to polycarbonate. Refractive index measurements were made ellipsometrically following the deposition of thinner coatings, typically 1000 Å, onto silicon wafers. The interfacial layer readily survived a 7 day 50° C. water soak test without losing adhesion. The adhesion test was done using the modified ASTM D3359 method. FIG. 1 shows a transmission spectrum in the UV-visible range of the interfacial layer on quartz. The graph of FIG. 1 clearly indicates that the interfacial layer is transparent in the UV range.

Next, an UV absorbant layer of 5000 Å thickness comprising $TiO_2$ was plasma deposited using titanium isopropoxide [Ti(IPO)$_4$] precursor on top of the interfacial layer of the aforementioned polycarbonate sample using the following process parameters:

| Flow rates | He | 170 sccm |
|---|---|---|
| | $O_2$ | 25 sccm |
| | Ti(IPO)$_4$ | 2.3 sccm |
| Pressure | | 0.2 Torr |
| Power | | 30 Watts |
| Frequency | | 75 kHz |
| Deposition Rate | | 182 Å/min |

It was found that ion compaction appeared to help in producing uniformly adherent UV absorbant $TiO_2$ coatings. Thus low frequency and/or low pressure was found to be desirable.

Figure 2:
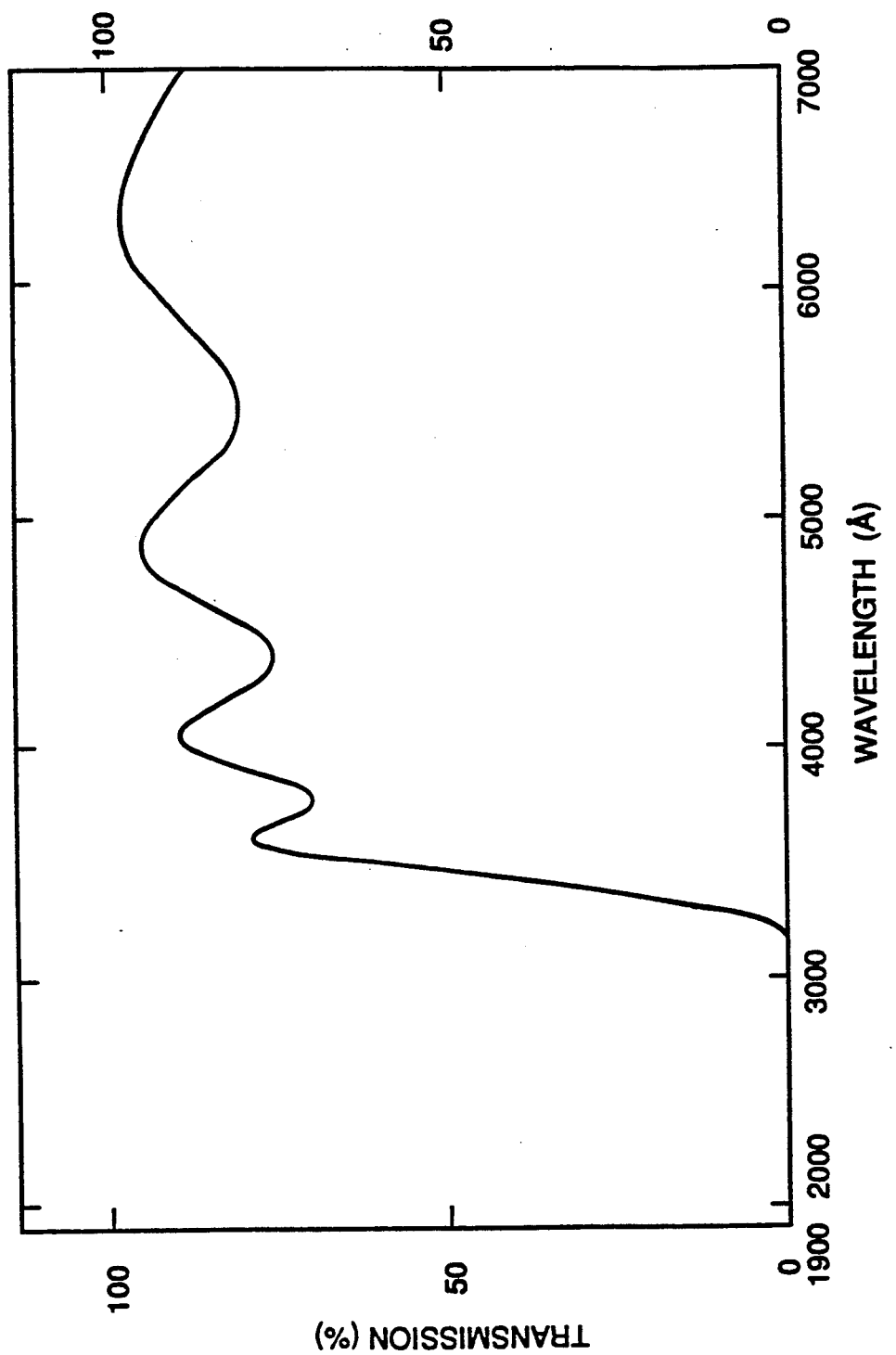
FIG. 2 shows a graph of the percentile transmissivity of the quartz substrate having the plasma polymerized interfacial layer and an UV absorbant layer thereon.

The resulting layered structure comprising the interfacial and the UV absorbant layers was transparent in the visible range but absorbing in the UV range as illustrated in FIG. 2. The index of refraction of the UV absorbant material was found to be 1.95, and it was measured ellipsometrically following the deposition of thinner coatings, typically 1000 Å, onto silicon wafers. The UV absorbant layer adhered well to the interfacial layer even after 7 days of the water soak test. The adhesion was tested under the modified ASTM D3359 test.

Finally an abrasion resistant layer of 50,000 Å thickness comprising $SiO_2$ was plasma polymerized using the aforementioned silane reaction on top of the UV absorbant layer of the aforementioned polycarbonate sample using the following process parameters:

| Flow rates | He | 588 sccm |
|---|---|---|
| | $SiH_4$ | 12 sccm |
| | $N_2O$ | 384 sccm |
| Pressure | | 0.6 Torr |
| Power | | 14 Watts |
| Frequency | | 13.56 MHz |
| Dep. Rate | | 384 Å/min |

Figure 3:
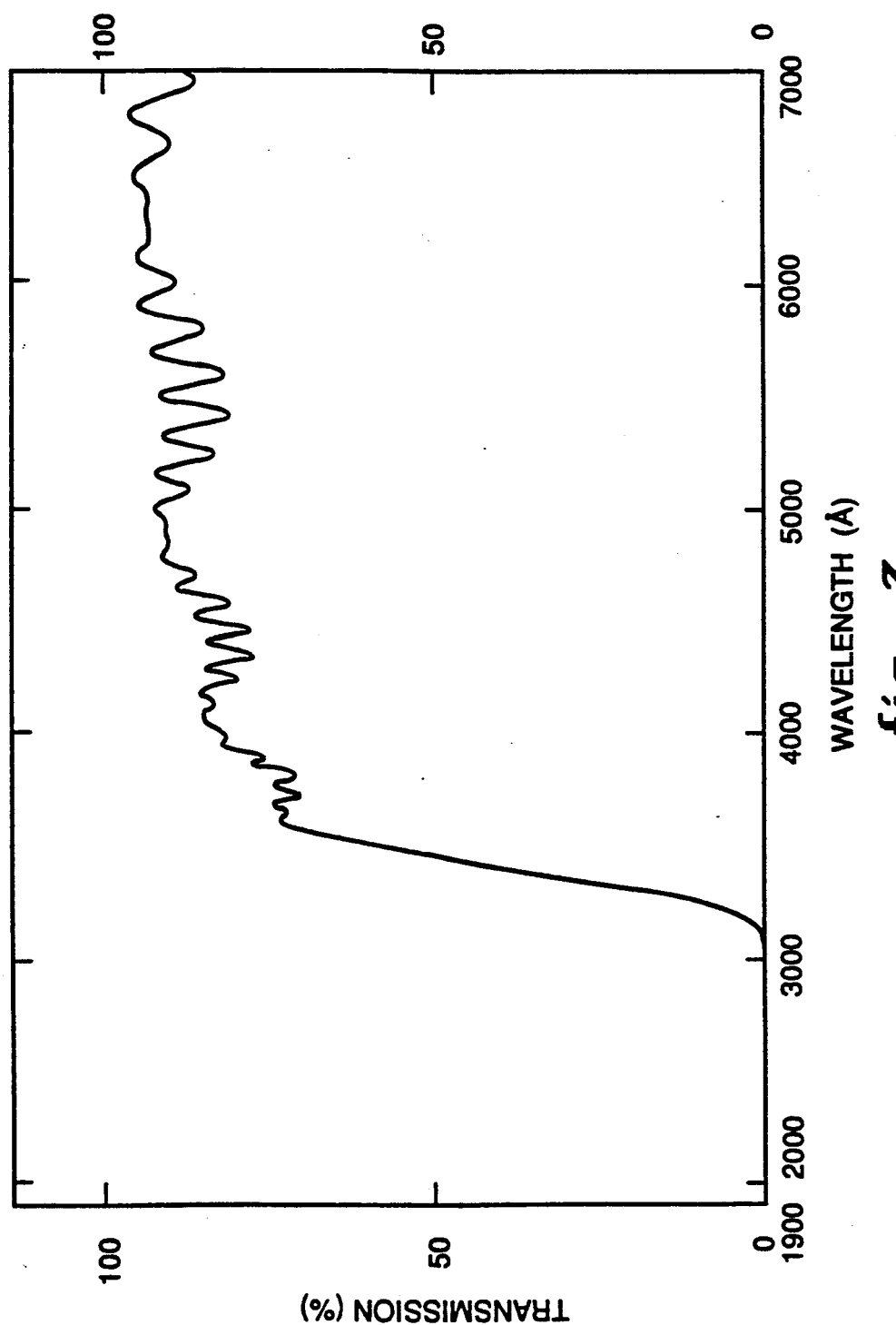
FIG. 3 shows a graph of the percentile transmissivity of the quartz substrate having the plasma polymerized interfacial layer, the UV absorbant layer and an abrasion resistant layer thereon.
Figure 4:
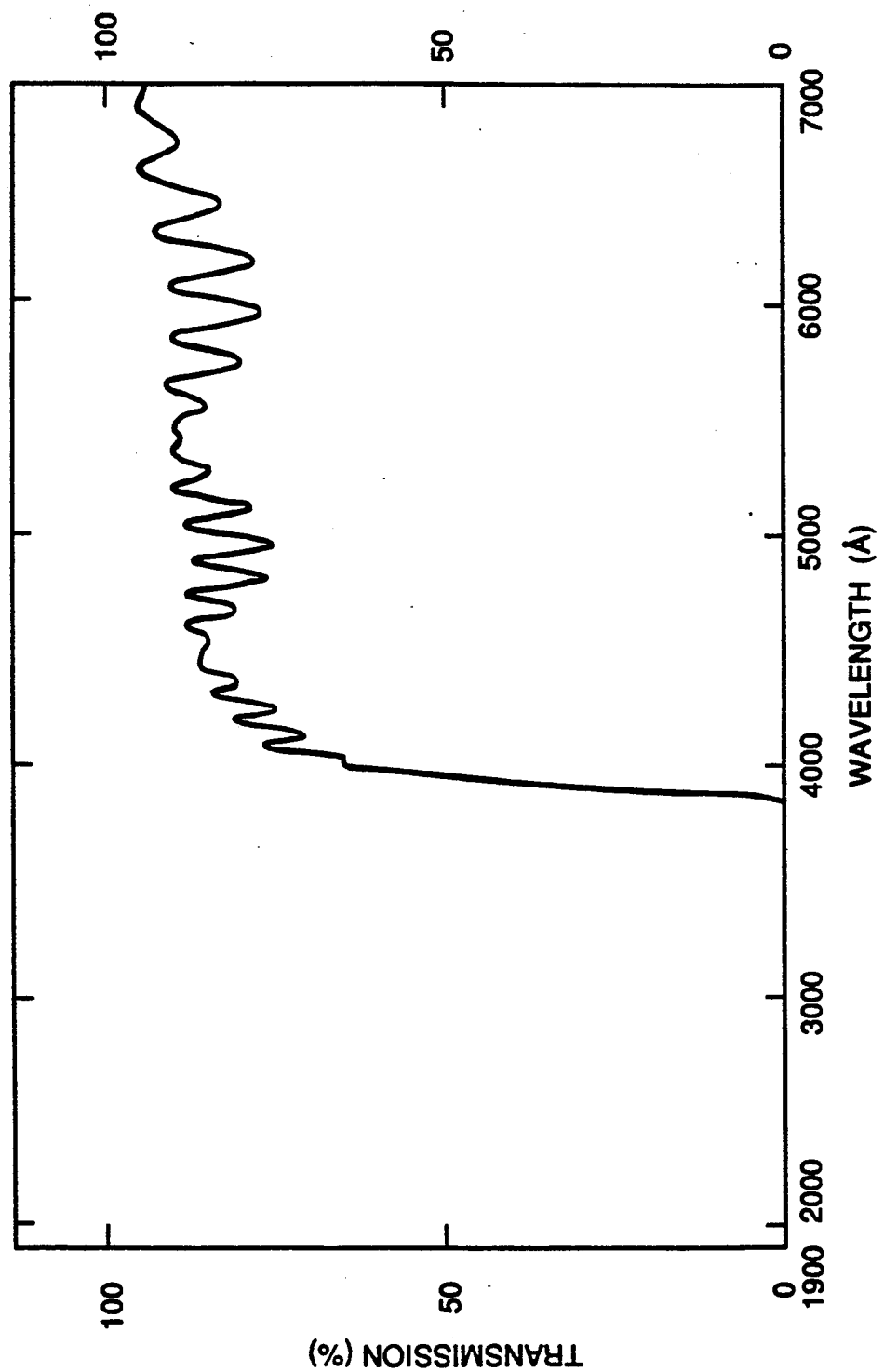
FIG. 4 shows a graph of the percentile transmissivity of a polycarbonate substrate having a plasma polymerized interfacial layer, an UV absorbant layer and an abrasion resistant layer thereon.

The resulting layered structure comprising the interfacial, the UV absorbant and the abrasion resistant layers had a very good transmission (>80%) in the visible range with good UV absorption. The index of refraction of the abrasion resistant layer was found to be 1.478. The percentile transmissivities for structures deposited on quartz and polycarbonate are illustrated in FIGS. 3 and 4 respectively. It should be noted that the stabilized polycarbonate is absorbing below 3900 Å, as shown in FIG. 4. The resulting structure passed the modified ASTM D3359 adhesion test before and after seven days of the water soak test.

EXAMPLE 2

Two layered structures comprising 3000 Å of HMDSO, 5000 Å of $TiO_2$, and 50,000 Å of $SiO_2$ layers were made. The layered structure, noted as structure B, was made under the conditions of Example 1. The layered structure, noted as structure A, was made under the conditions stated below:

| Flow rates | He | 488 sccm |
|---|---|---|
| | $SiH_4$ | 10 sccm |
| | $N_2O$ | 320 sccm |
| Pressure | | 0.8 Torr |
| Power | | 14 Watts |
| Frequency | | 13.56 MHz |
| Deposition Rate | | 417 Å/min |

The abrasion resistance as ΔHaze percentage [ΔH(%)] after 1000 cycles, performed under ASTM D1044 and D1003, and adhesion measured before and after 7 days of the water soak test are shown in Table I below:

TABLE 1

| | Measurement Befor Water Test | | | Measurement After Water Test | | |
|---|---|---|---|---|---|---|
| Structure | T (%) | ΔH (%) | Adhesion | T (%) | ΔH (%) | Adhesion |
| A | 83.5 | 1.65 | Pass | — | — | Pass |
| B | — | — | Pass | 84 | 1.73 | Pass |

What is claimed is:

1. A method of forming a transparent, abrasion resistant and ultraviolet light absorbant article comprising:
   plasma enhanced chemical vapor deposition of an interfacial layer of an adherent resinous composition on the surfaces of said article;
   plasma enhanced chemical vapor deposition of a layer of an ultraviolet light absorbant composition selected from the group consisting of zinc oxide, titanium dioxide, cerium dioxide and vanadium pentoxide on said interfacial layer of said adherent resinous composition; and
   plasma enhanced chemical vapor deposition of a layer of an abrasion resistant composition on top of said layer of said ultraviolet light absorbant composition, said layer of said abrasion resistant composition exhibiting increase in haze of less than 15% after 1000 cycles under The Taber Abrasion Test, designated by American Society for Testing and Materials, as ASTM D1044 or its equivalent.

2. The method according to claim 1 wherein said article is made of polycarbonate or polymethyl methacrylate.

3. The method according to claim 1 wherein said adherent resinous composition is plasma polymerized during said plasma enhanced chemical vapor deposition.

4. The method according to claim 1 wherein said adherent resinous composition comprises an interfacial material selected from the group consisting of organosilicon, organometallic, acrylic, and polyolefin materials.

5. The method according to claim 4 wherein said interfacial material is formed by polymerizing an olefinic monomer in the plasma.

6. The method according to claim 4 wherein said interfacial material is formed by polymerizing an acrylic monomer in the plasma.

7. The method according to claim 4 wherein said interfacial material is formed by polymerizing an organosilicon monomer in the plasma.

8. The method according to claim 7 wherein said organosilicon monomer is selected from the group consisting of hexamethyldisilazane, hexamethyldisiloxane, vinyl trimethylsilane, and octamethylcyclotetrasiloxane.

9. The method according to claim 1 wherein said abrasion resistant composition is selected from the group consisting of silicon carbide, silicon dioxide, silicon nitride, silicon oxynitride, boron oxide, boron nitride, aluminum oxide, aluminum nitride, and mixtures thereof.

10. The transparent, abrasion resistant and ultraviolet light absorbant article produced according to the method of claim 1 on a transparent plastic substrate.

11. A method of forming a transparent, abrasion resistant and ultraviolet light absorbant polycarbonate article comprising:
    plasma enhanced chemical vapor deposition of an interfacial layer having thickness of about 100 Å to about 10,000 Å of an adherent resinous composition of hexamethyldisiloxane on the surfaces of said polycarbonate article;

plasma enhanced chemical vapor deposition of a layer having thickness of about 1000 Å to about 10,000 Å of an ultraviolet light absorbant composition of titanium dioxide on top of said layer of said adherent resinous composition; and plasma enhanced chemical vapor deposition of a layer having thickness of about 20,000 Å to about 90,000 Å of an abrasion resistant composition of silicon dioxide on top of said layer of said ultraviolet light absorbant composition, said layer of said abrasion resistant composition exhibiting increase in haze of less than 15% after 1000 cycles under The Taber Abrasion Test, designated by American Society for Testing and Materials, as ASTM D1044 or its equivalent.

* * * * *